Dec. 13, 1966 TOSHIHIKO TAKAGI ETAL 3,291,901

COLOR TELEVISION SIGNAL GENERATING SYSTEM AND IMAGE PICKUP TUBE THEREFOR

Filed July 16, 1963 4 Sheets-Sheet 1

INVENTORS
Toshihiko Takagi
Shusaku Nagahara

BY Hill, Sherman, Meroni, Gross & Simpson

ATTORNEY

INVENTORS
Toshihiko Takagi
Shusaku Nagahara
BY
Hill, Sherman, Meroni, Gross & Simpson
ATTORNEY INVENTORS
Toshihiko Takagi
Shusaku Nagahara BY
Hill, Sherman, Meroni, Gross & Simpson
ATTORNEY INVENTORS
Toshihiko Takagi
Shusaku Nagahara
BY Hill, Sherman, Meroni, Gross & Simpson
ATTORNEY 3,291,901

COLOR TELEVISION SIGNAL GENERATING SYSTEM AND IMAGE PICKUP TUBE THEREFOR

Toshihiko Takagi and Shusaku Nagahara, Kawasaki, Japan, assignors to Nippon Columbia Kabushikikisha (Nippon) Columbia Co., Ltd., Kawasaki, Japan, a corporation of Japan Filed July 16, 1963, Ser. No. 295,412
Claims priority, application Japan, July 26, 1962, 37/31,707
8 Claims. (Cl. 178—5.4)

This invention relates to a color television signal generating system and an image pickup tube to be used therein, and is more particularly concerned with a novel system for obtaining color television signals by the use of a single image pickup tube and the pickup tube to be employed therein.

In a simultaneous color television system heretofore used, at least two image pickup tubes are usually employed, from which respectively different color component signals are obtained and these signals are composed to obtain three primary color signals of, for example, red, green and blue. However, the conventional system has disadvantages in that the apparatus thereof becomes inevitably large in size and expensive because the system requires a plurality of image pickup tubes.

In order to remove the foregoing disadvantage there has recently been proposed a system in which simultaneous color television signals are obtained by the use of a single image pickup tube. The pickup tube to be employed in this system is disclosed in the U.S. Patent No. 2,634,328. In the system of this patent, however, a considerable amount of electrostatic capacity is produced between a plurality of target electrodes and in addition leakage is produced in horizontal direction with the result that crosstalk is caused to occur. The target electrode is divided into a plurality of electrode elements, so that the whole area of the electrode is small and the coefficient of utilization of electron beam is low. In addition, the target electrode and filter elements are difficult to arrange.

In view of the foregoing a principal object of this invention is to remove the disadvantages heretofore encountered in the art.

Other objects, features and advantages of this invention will become apparent from the following description taken in conjunction with the accompanying drawings in which.

Figures 4A, 4B, 4C:
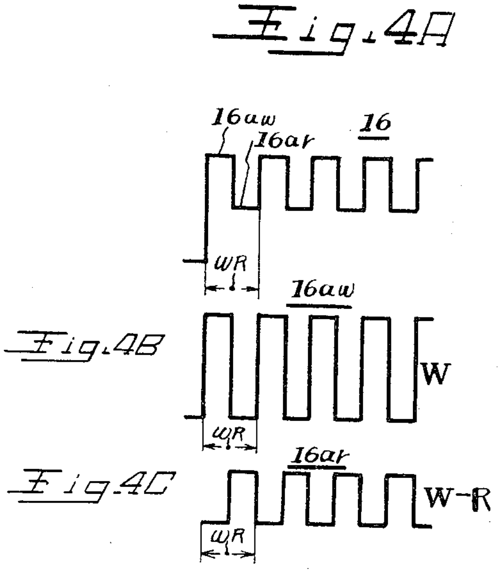
Figure 6:
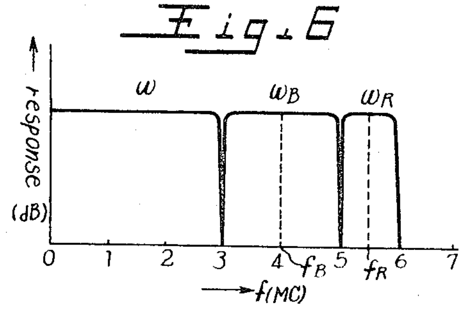
Figure 7:
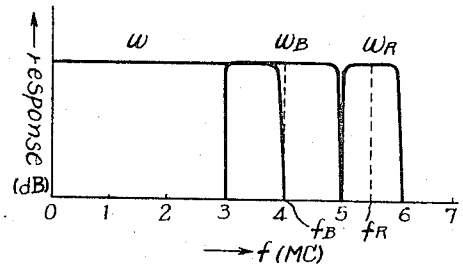
Figure 5:
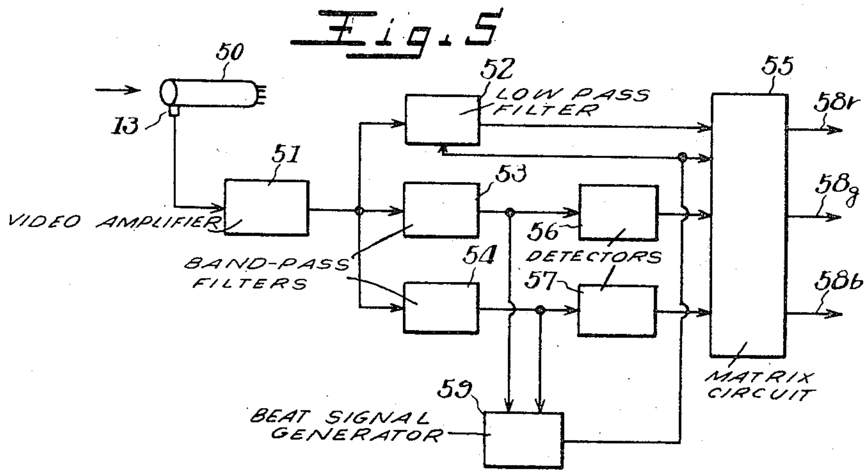
Figures 8, 9A, 9B, 10A, 10B, 13A, 13B:
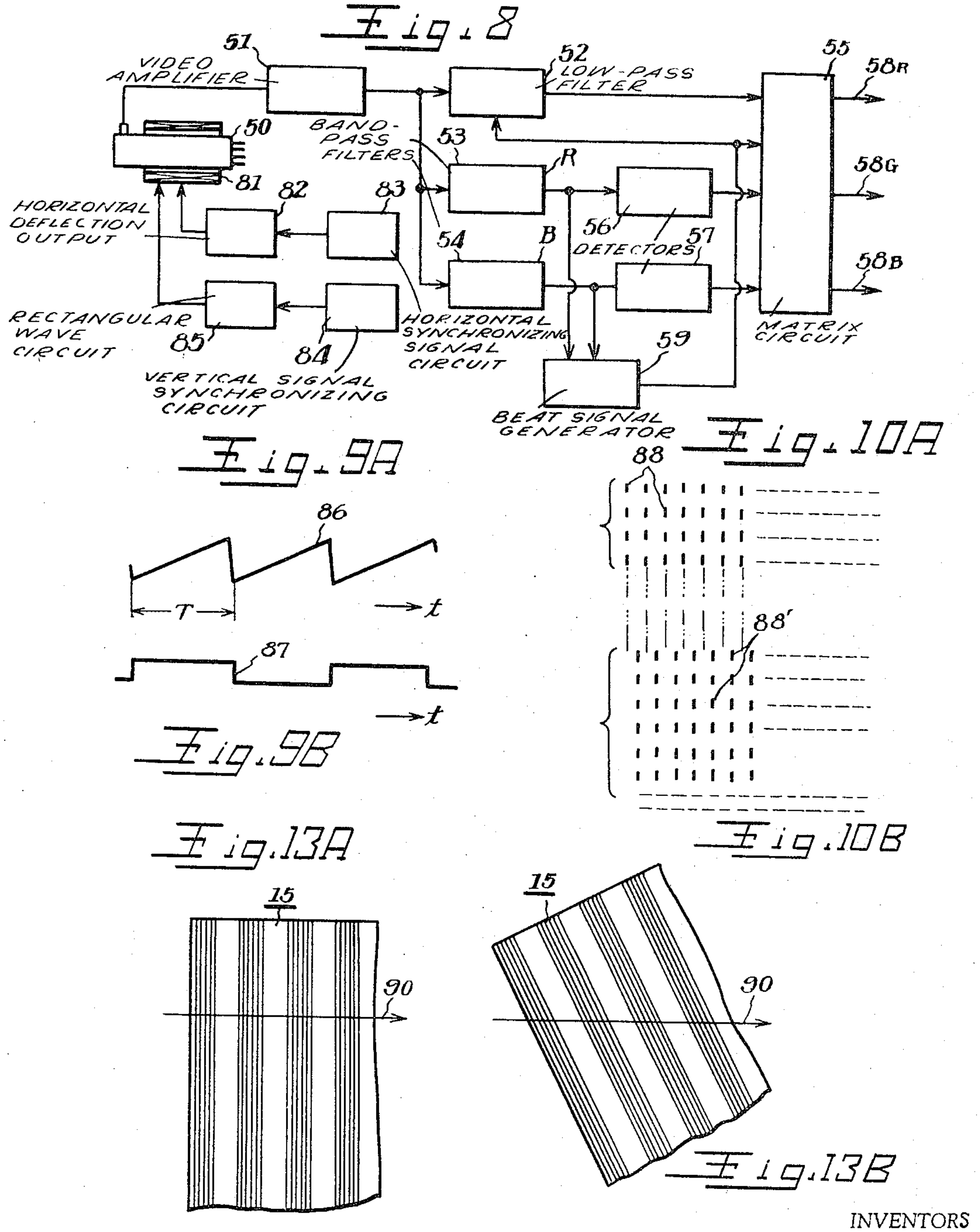
Figure 11:
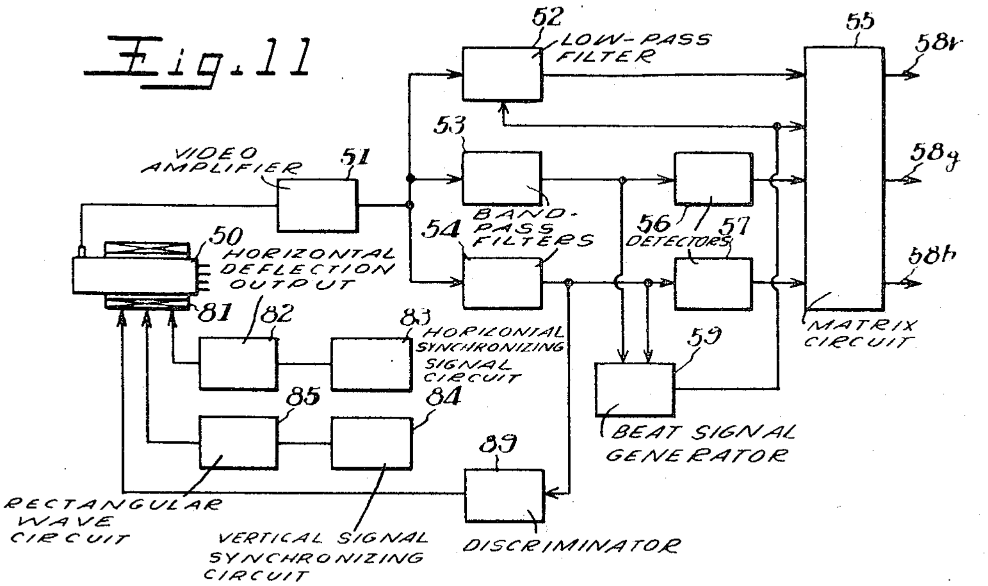
Figure 12:
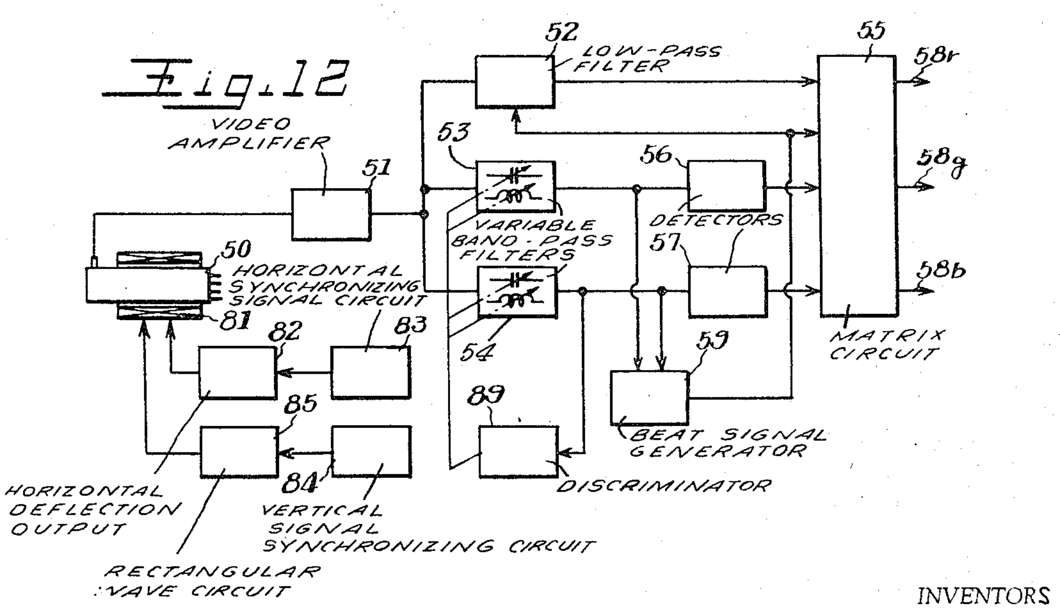

FIGURES 4A, 4B, and 4C waveform diagrams for explaining it;

FIGURE 5 is a system diagram illustrating an example of the color television signal generating system of this invention;

FIGURE 6 is a band-pass characteristic diagram, for explaining the system of this invention;

FIGURE 7 is also a band-pass characteristic diagram, for explaining the system of this invention;

FIGURE 8 is a system diagram showing another example of the system of this invention;

FIGURES 9A and 9B are diagrams for explaining the example shown in FIGURE 8;

FIGURES 10A and 10B are diagrams also explanatory of the example in FIGURE 8, too;

FIGURE 11 is a system diagram showing another embodiment of the system of this invention;

FIGURE 12 is also a system diagram illustrating a yet further embodiment of the system of this invention; and FIGURES 13A and 13B are diagrams for explaining another example of the system of this invention.

Figure 1:
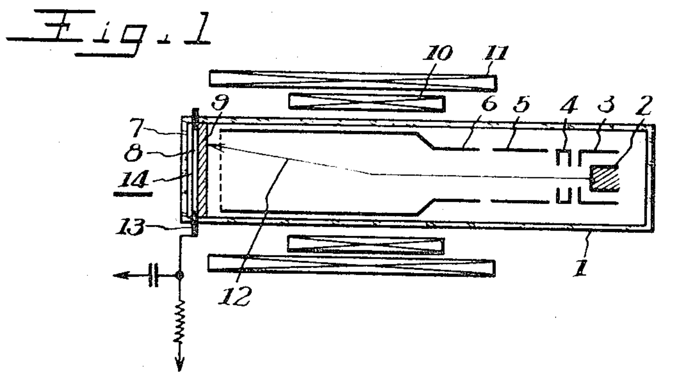
FIGURE 1 is a schematic diagram illustrating an example of an image pickup tube, for explaining a color television signal generating system according to this invention.
Figure 2:
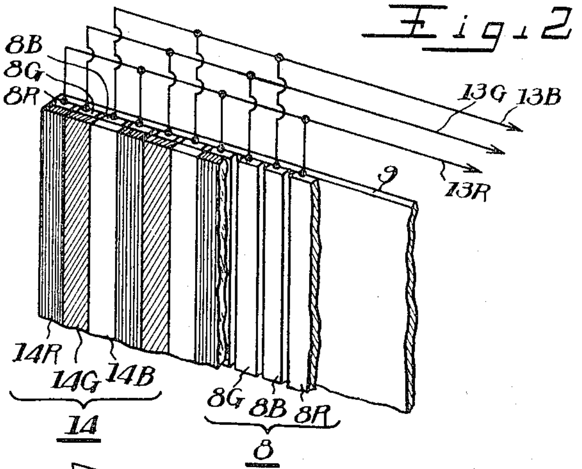
FIGURE 2 is a schematic perspective view of the main part of a conventional image pickup tube.

Referring to FIGURES 1 and 2, an image pickup tube usually employed will hereinbelow be explained for a better understanding of this invention.

The well-known pickup tube is the so-called tricolor vidicon, which is provided with a cathode 2, a first grid 3, a second grid 4, a third grid 5, a fourth grid 6 in its cylindrical tube 1, and a transparent conductive layer, namely a target electrode 8 arranged inside the end face, namely a face 7 of the tube 1, and a photoconductive layer 9 disposed within the target electrode. Furthermore, a deflection coil 10 and a focus coil 11 are arranged on the outside of the tube 1 and an optical image is focused on the photoconductive layer 9 from the face 7, which image is then scanned by an electron beam from the cathode 2, and an external output terminal 13 is connected to the target electrode 8. In such a pickup tube, there is provided a filter 14 between the face 7 and the target 8 in the tube 1, such that red, green and blue filter elements 14R, 14G and 14B of narrow width extending in a direction substantially vertical to the horizontal scanning direction of the electron beam are arranged in orderly sequence, as is apparent from FIGURE 2. The aforementioned target electrode is divided into traget electrode elements 8R, 8G and 8B in accordance with the number of the filter elements of the filter 14, and the respective target elements 8R corresponding to the red filter elements 14R are connected by a lead, to which a red color signal output terminal 13R is connected. Similarly, the respective target elements 8G and 8B corresponding to the green and blue filter elements 14G and 14B are respectively connected, to which green and blue signal output terminals 13G and 13B are connected. As a result of this, photoelectric-conversion outputs corresponding to red, green and blue can be obtained respectively from the output terminals 13R, 13G and 13B. The outputs obtained from these terminals 13R, 13G and 13B are added to low-pass filters respectively having suitable time constants, thereby obtaining simultaneous color television signals. The device for obtaining the simultaneous color television signals from the terminals 13R, 13G and 13B is well known and easy for those in the art to infer, and hence no further detailed explanation will be made thereon.

However, in the case where simultaneous color television signals are obtained by the use of such a pickup tube as described above, the target electrode 8 is subdivided in accordance with the respective filter elements of the filter 14 as shown by 8R, 8G and 8B and these target elements are extremely close to adjacent ones. Accordingly, a considerable amount of electrostatic capacity exists and a leakage resistance of the horizontal direction is produced on the photoconductive layer 9, so that crosstalk is caused to occur due to them, which is very difficult to remove.

Since the target electrode 8 is divided, the whole area of the target electrode 8 opposite to the photoconductive layer 9 is smaller than that of the layer and as a result the extent of utilization of the electron beam is reduced that much. Furthermore, leads must be connected respectively to many target electrodes and that these leads are connected selectively to one another to form a filter with the three filter elements, which makes it very difficult to manufacture it.

This invention is intended to remove the foregoing disadvantages heretofore encountered and the objects, features and advantages of this invention will be made clear from the following disclosure taken in connection with FIGURES 3 through 13.

Now an image pickup tube applicable to this invention will hereinafter be explained.

The pickup tube usable in this invention can be formed in the same manner as that described above in FIGURES 1 and 2 except in the construction of the target 8 and the filter 14. Therefore, in FIGURE 3 the parts corresponding to those in FIGURES 1 and 2 are marked with the same numeral references.

The target electrode to be used in this invention is for a color television image pickup tube, but it is not composed of a plurality of target electrode elements, so that the output terminal 13 of the pickup tube 1 is single. This target electrode is the same as that of a monochrome pickup tube.

Figure 3:
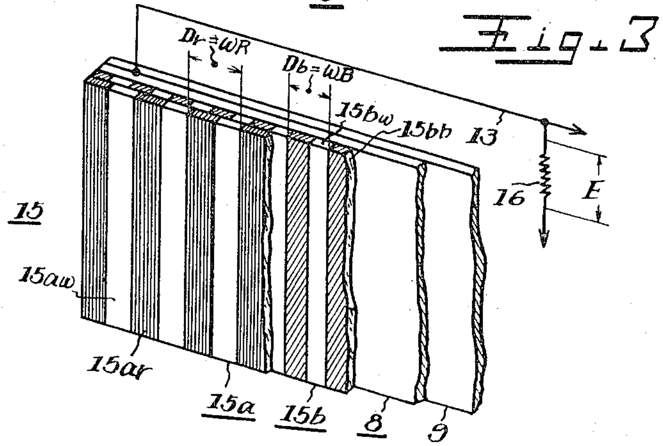
FIGURE 3 is a schematic perspective view of the essential part of the image pickup tube of this invention.

A novel feature of this invention resides in a filter which is placed in front of the face 7 or between the target electrode 8 and the face 7. One example of this filter is shown in FIGURE 3, in which it is composed of two filter components **15*a* and 15*b*. One filter component 15*a* consists of a first strip filter element 15*a*ω which substantially passes therethrough all colored lights from an object to be televised or intercepts at least one of them, and of a second strip filter element 15*ar* which substantially cuts off one of the lights which is different from that intercepted by the filter element 15*a*ω, these two filter elements being arranged alternately. For example, when an object is televised under white light the filter element 15*a*ω permits the white light to pass essentially. In some cases, it may be made such that slightly intercepts, for example the green portion of the white light. The filter element 15*ar*** is of such a character that cuts off, for example the red light only.

The width of the filter elements **15*a*ω and 15*ar* can be selected as desired, but the width $D_r$ formed by the adjacent filter elements 15*a*ω and 15*ar*** is determined to be a constant value and it is referred to as a "pitch" in this specification. This pitch may preferably be selected to be smaller than the picture element of a picture on a pickup tube.

The other filter component **15*b* in this example is different from the first filter component 15*a*. That is, the second filter component 15*b* is formed of strips in a similar manner to the first filter component 15*a*, but it is composed of a third strip filter element 15*b*ω which does not substantially intercept all the lights from an object to be televised or cuts off one of them, and of a fourth strip filter element 15*bb* which intercepts a light which is different from those cut off by the first and third filter elements 15*a*ω and 15*b*ω, these two filter elements being arranged alternately. For example, the third filter element 15*b*ω can be colorless, transparent which passes therethrough a white light, and the fourth filter element 15*bb* can be such that intercepts a blue light when the second element 15*ar* of the first filter component cuts off a red light. However, it should be noted here that the width $D_b$, namely the pitch of the third and fourth filter elements 15*b*ω and 15*bb* should be different from that $D_r$ of the first filter component 15*a***.

It is possible that such two filter components **15*a* and 15*b* are made separately and these are made to be a filter integrated in a manner so that the extending directions of the filter elements 15*a*ω, 15*ar*, 15*b*ω and 15*bb* are the same, and it is also possible to obtain a filter 15** having two filter components by printing twice the separate components on a transparent base plate.

Such a filter 15 is interposed between the face portion 7 and the target electrode 8 in the tube 1 as described above referring to FIGURE 1. It might be said that the filter is piled on the face of the target in an optically adherent condition. In this case, the extending direction of the filter elements may preferably be substantially vertical to the scanning direction of the electron beam, but it is not always limited to it, as is apparent from the following description.

Assume that the pitch $D_r$ of the first and second filter elements **15*a*ω and 15*ar* and the pitch $D_b$ of the third and fourth filter elements 15*b*ω and 15*bb* are space angular velocities $\omega_R$ and $\omega_B$ with respect to the horizontal scanning direction of the electron beam 12**. These space angular velocities $\omega_R$ and $\omega_B$ may preferably be selected to be higher than those at the time when scanning the picture elements of a picture image. However, these $\omega_R$ and $\omega_B$ are selected to be the most suitable values to satisfy the electrical factor to a transmission system described later on.

Suppose that light energy L from an object to be transmitted which enters the photoconductive layer 9 from the face 7 of the pickup tube in the case where the first and third filter elements **15*a*ω and 15*b*ω are made to pass white light and the second and fourth filter elements 15*a*γ and 15*bb* are made to intercept respectively red and blue lights in white light in the above described arrangement. If now only the first filter component 15*a* is interposed between the face 7 and the target electrode 8, the pattern of a colored light projected to the photo-conductive layer 9 from the face 7 is composed of a pattern 16*a*ω of the colored light passing through the first filter element 15*a*ω and a pattern 16*ar* of the colored light through the second filter element 15*ar*, as shown in FIGURE 4A and this pattern becomes a pattern 16 the patterns 16*a*ω and 16*ar* of which are different in energy. The energy of the pattern 16*a*ω is the energy of the white ray of light containing all the colored lights and that of the pattern 16*ar* contains an energy that the energy of the red light is deducted from that of the white light, so that the energy of the latter is smaller than that of the former pattern 16*a*ω. If the energy of the white light is W and that the energy of the red light is R, the energy projected to the photoconductive layer 9 through the second filter element 15*ar* is expressed by $W-R$. The pattern shown in FIGURE 4A may be analyzed into a pattern 16*a*ω of W such as shown in FIGURE 4B and a pattern 16*ar* of $W-R$ such as shown in FIGURE 4C. The pitch of the two patterns is $\omega_R$, and accordingly an energy $L_W$ of 16*a*ω** shown in FIGURE 4B is expressed as follows:

$$L_W=\frac{W}{2}+\sum_{n=1}^{\infty}\frac{W_n}{2}\cos n\omega_R t \tag{1}$$

The energy $L_{W-R}$ of the pattern **16*ar*** shown in FIGURE 4C is given by $$L_{W-R}=\frac{W-R}{2}-\sum_{n=1}^{\infty}\frac{(W-R)_n}{2}\cos n\omega_R t \tag{2}$$

where the duty cycle of the pitches $D_r$ and $D_b$ is 1. Consequently the light energy shown in FIGURE 4A, namely the energy $L_R$ of a light produced on the photoconductive layer 9 is given by the following formula as the sum of the above Formulas 1 and 2, $$L_R=\frac{W}{2}+\frac{W-R}{2}+\sum_{n=1}^{\infty}\frac{W}{2}\cos n\omega_R t-\sum_{n=1}^{\infty}\frac{(W-R)_n}{2}\cos n\omega_R t \tag{3}$$

When the second filter component **15*b* alone is interposed between the face 7 and the target electrode 8, the light energy $L_b$ produced on the photoconductive layer 9** is similarly given as follows, $$L_b=\frac{W}{2}+\frac{W-B}{2}+\sum_{n=1}^{\infty}\frac{W_n}{2}\cos n\omega_B t-\sum_{n=1}^{\infty}\frac{(W-B)_n}{2}\cos n\omega_B t \tag{4}$$

Therefore, the total light energy L produced on the photoconductive layer 9 through the two filter components 15a and 15b is the sum of the above Formulas 3 and 4, and hence it follows that $$L=\left(W-\frac{R}{2}-\frac{B}{2}\right)-\sum_{n=1}^{\infty}\frac{R_n}{2}\cos n\omega_R t-\sum_{n=1}^{\infty}\frac{B_n}{2}\cos n\omega_B t \quad (5)$$

Such a light is focused on the photoconductive layer and then scanned by electron beams, thereby obtaining an output voltage at a load 16 connected to the output terminal 13. The photoelectro-conversion characteristic is usually logarithmic so that an output voltage E across the load 16 is expressed by the following formula, $$E=\left(E_W-\frac{1}{2}E_R-\frac{1}{2}E_B\right)-\sum_{n=1}^{\infty}\frac{1}{2}E_{R_n}\cos n\omega_R t-\sum_{n=1}^{\infty}\frac{1}{2}E_{B_n}\cos n\omega_B t+\sum_{n=1}^{\infty}K_n E_{R_n}E_{B_n}\cos n(\omega_R\pm\omega_B)t \quad (6)$$

where $E_W$ is an output voltage corresponding to the white light W, $E_R$ and $E_B$ are output voltages respectively corresponding to the red and blue lights and $\omega_R>\omega_B$.

In the foregoing one example of the pickup tube usable in this invention has been described and the output voltages of the load connected directly to the pickup tube has also been explained. We will hereinafter explain the case where color television signals are obtained from outputs of the pickup tube in the example described above.

FIGURE 5 illustrates its example, in which a single output terminal 13 of a pickup tube designated by 50 and explained in connection with FIGURES 3 and 4, is connected to a video signal amplifier 51. To this amplifier is supplied an output voltage such as expressed in the Formula 6 and amplified. At the next stage of the amplifier 51 are connected a low-pass filter 52 which passes frequency components under, for example 3 mc./s., a band-pass filter 53 having a predetermined band width over 3 mc./s. and another band-pass filter 54 having a band width over that of the filter 53. The low-pass filter 52 essentially passes the output voltage $(E_W-\frac{1}{2}E_R-\frac{1}{2}E_B)$ of the first term bracketed in the above Formula 6, and the band-pass filter 53 chiefly passes the component of the output voltage of the third term when $n=1$, namely the fundamental wave component voltage $\frac{1}{2}E_B \cos \omega_B t$, and the other band-pass filter 54 passes mainly the fundamental wave component voltage $\frac{1}{2}E_R \cos \omega_R t$ of the output voltage of the second term of the Formula 6. Consequently, the filter 52 passes the component of $\omega_R-\omega_B$ of the component of the fourth term of the Formula 6 (particularly $n=1$) and hence if the output voltage of the filter 52 is $E_\omega$, the following output is obtained at its output terminal.

$$E_\omega=(E_W'-\tfrac{1}{2}E_R'-\tfrac{1}{2}E_B')+kE_R'E_B'\cos(\omega_R-\omega_B)t \quad (7)$$

Further, if the output voltages of the filters 53 and 54 are respectively $E_b$ and $E_r$, the following output voltages are obtained respectively at their output terminals.

$$E_b=\tfrac{1}{2}E_B'\cos\omega_B t \quad (8)$$

$$E_r=\tfrac{1}{2}E_R'\cos\omega_R t \quad (9)$$

where $k$ is a proportional constant. Dashes put on $E_W$, $E_R$ and $E_B$ imply that the transmission coefficients of the respective filters are taken into account.

$E_W'$ in the Formula 7 is a voltage showing white that the three primary color components of red, green and blue are mixed, so that the voltage in the bracket contains the three color components. $E_R'$ and $E_B'$ in the Formulas 8 and 9 are respectively independent component voltages of blue and red of the three primary color components. Accordingly, it will easily be seen that the three primary color components of red, green and blue may be obtained individually at the same time. The output voltage $E_\omega$ from the filter 52 corresponds to a luminance signal including the red, green and bluue color components, so that this signal is added directly to a matrix circuit 55. The output voltages $E_b$ and $E_r$ of the filters 53 and 54 are added respectively to envelope detectors 56 and 57, at the output ends of which detected red and blue chrominance signal voltages $E_b'$ and $E_r'$ are obtained. These voltages $E_r'$ and $E_b'$ are expressed as follows, $$E_r'=E_r'' \quad (10)$$

$$E_b'=E_b'' \quad (11)$$

and they are added to the matrix circuit 55 to obtain red, green and blue color signals $E_r'''$, $E_g'''$ and $E_b'''$ respectively at its output terminals 58r, 58g and 58b. In this case, $E_r''$ and $E_b''$ imply that the output voltages $E_b'$ and $E_r'$ in the Formulas 8 and 9 have been obtained through the detectors 56 and 57.

$E_W'-\frac{1}{2}E_R'-\frac{1}{2}E_B'$ is expressed as $E_G'+\frac{1}{2}E_R'+\frac{1}{2}E_B'$ because it may be considered to be as follows, $$E_W'=E_G'+E_R'+E_B'$$

where $E_G'$ is a voltage of a green light. Therefore, by positioning in a suitable place in an optical path a filter to decrease the transmission factor of the green light alone besides the aforementioned, filters 15a and 15b,

$E_W'-\frac{1}{2}E_R'-\frac{1}{2}E_B'$ becomes $\frac{1}{2}E_G'+\frac{1}{2}E_R'+\frac{1}{2}E_B'=\frac{1}{2}E_W$ and color video signals of all the rays of colored lights may be obtained.

In the foregoing we have explained the means for separating the video signals for the three kinds of colored lights, but it will be apparent that in the case of obtaining video signals of two kinds of colored lights one of the aforesaid filter components is left out and that the electrical circuit therefor is also omitted.

It will be seen that simultaneous color television signals may be obtained in the manner described above. However, the output voltage $E_\omega$ of the filter 52 to be added directly to the matrix circuit 55 contains a component such as $kE_R'E_B'\cos(\omega_R-\omega_B)t$ in the Formula 7, which component is harmful in obtaining the three primary color components. That is, since the component of $$kE_R'E_B'\cos(\omega_R-\omega_B)t$$

is included in a band of $(E_\omega'-\frac{1}{2}E_R'-\frac{1}{2}E_B')$, this component is produced particularly at the output terminal 58g of the green color signal, and when other color component signals are reproduced together with the green color signals at a reproducing device, namely at a receiver stripes of the pitch due to $(\omega_B-\omega_R)$ are produced in its picture.

In order to eliminate this harmful component, the outputs of, for example the filters 53 and 54 are supplied respectively to beat signal generating circuit 59. It will be apparent that thus a beat signal output voltage expressed by the following formula is obtained, $$E_m=-kE_R'E_B'\cos(\omega_R-\omega_B)t \quad (12)$$

where $k$ is a constant. Then, this output is supplied to the filter 52 or to the preceding stage of the matrix circuit 55, namely to a signal transmission line including the filter 52.

Thus, the harmful component in the output voltage $E_\omega$, namely the component $kE_R'E_B'\cos(\omega_R-\omega_B)t$ of the second term of the Formula 7 is eliminated and the Formula 7 may be expressed as follows, $$E=(E_\omega'-\tfrac{1}{2}E_R'-\tfrac{1}{2}E_B') \quad (13)$$

Accordingly, by using the output voltage $E_\omega$ in the Formula 13 and the output voltages $E_R''$ and $E_B''$ in the Formulas 6 and 7, the red, green and blue color signals $E_R$, $E_G$ and $E_B$ may be easily and accurately obtained at the output ends of the matrix circuit 55.

The novel system of this invention will easily be understood from the foregoing. Now we will hereinbelow explain an example of the band and its width of a band signal of a video signal to be analyzed into the pitch and the color component of a novel filter applied to the pickup tube described above.

It is known that the visual color characteristic has the highest resolution for black-and-white informations and that its resolution varies with the chromaticity in case of color information. Accordingly, if the relatively wide band width of 3 mc./s. such as shown in FIGURE 6 is given to the filter 52 for obtaining the signal $E_\omega$ of the Formula 7 from the signals of the Formula 6 (the component of the second term in the Formula 7 is unnecessary), a band width of $\pm 1$ mc./s. is given to the filter 53 for obtaining the blue color signal of a relatively high resolution, namely the signal $E_b$ of the Formula 8, and a band width of $\pm 0.5$ mc./s. is given to the filter 54 for obtaining the red color component voltage $E_r$ of the Formula 9 having a relatively low resolution, the center frequencies $f_B$ and $f_R$ of the filters 53 and 54, namely $\omega_{B/2\pi}$ and $\omega_{R/2\pi}$ become respectively 4 mc./s. and 5.5 mc./s. The pitchs of the color filters with respect to these $\omega_B$ and $\omega_R$ are respectively given in the form of the product of the width of a picture $\omega_{B/2\pi}$ and the horizontal scanning frequency, and the width of a picture/$\omega_R/2\pi$ and the horizontal scanning frequency.

FIGURE 7 illustrates an example in which when the entire band width is 6 mc./s. a high apparent resolution is to be obtained in the same manner as in FIGURE 6, that is, the upper cutoff frequency of the filter 52 is extended approximately up to the center frequency $f_B$ of $\omega_B$ and the band width of the filter 52 is set at about 4 mc./s. in a range from 0 to 4 mc./s. The band widths of other filters 53 and 54 are the same as in FIGURE 6. It will be apparent that the band width of the filter 52 is extended, while the band widths of the filters 53 and 54 may be further narrowed so as to particularly effect the omission of color informations of details.

It is useful in increasing an apparent resolution to overlap one portion of the band of the filter 52 in the band of the filter 53 as described above referring to FIGURE 7. However, the component of $\frac{1}{2} E_B' \cos \omega_B t$ is mixed in the output voltage $E_\omega$ of the filter 52 shown in the Formula 7 or 12. Accordingly, stripe-pattern due to $\omega_B$ appears in a picture in a reproducing device (a cathode-ray tube) and becomes a harmful component. Means for removing such harmful component will hereinbelow be explained with reference to FIGURES 8, 9A and 9B. FIGURE 8 shows an example in which a circuit for removing such harmful component is provided in the circuit illustrated in FIGURE 5, and parts corresponding to those in FIGURE 5 are marked with the same numeral references and no further explanation will be made. But assume that the band width of the filter 52 is in the band of the filter 53 as described previously in FIGURE 7. The pickup tube 50 is shown having a horizontal deflection coil 81 added thereto. To the horizontal deflection coil 81 is connected a horizontal deflection output circuit 82 as usual, which circuit is driven by a horizontal synchronizing signal circuit 83 in synchronism therewith. 84 is a vertical synchronizing signal circuit for a vertical deflection coil (not shown in the drawing) of the pickup tube 50.

In order to remove the harmful component such that the stripe-pattern due to $\omega_B$ appears in a picture of a reproducing device, there is provided a circuit 85 which is driven by signals from the vertical synchronizing signal circuit 84 and produces rectangular wave currents, then the output therefrom is supplied to the horizontal deflection coil 81, being superimposed on the horizontal deflection output from the circuit 82. This rectangular wave signal can easily be understood from the explanation of FIGURE 9. That is, an output current to be supplied to the vertical deflection coil from the vertical deflection output circuit (not shown) which is driven by the vertical synchronizing signal circuit 84 is expressed in the form of a saw tooth wave current 86 such as shown in FIGURE 9A. The period T of this saw tooth waveform current is equal to that of one frame in a reproducing device or an image pickup tube. Accordingly there is obtained a current 87 having such a period that it turns "on" and "off" every one frame as shown in FIGURE 9B. This is a rectangular wave current. By applying this rectangular wave current to the horizontal deflection coil, picture of one frame is displaced in the horizontal direction. The value of the displacement is selected to be such that the aforementioned stripe-patterns appear between adjacent ones, being displaced from their positions when the rectangular wave current is not applied. That is, if a stripe-patterns 88 shown in FIGURE 10A appear in the duration of one frame when the rectangular wave signal 87 is not applied to the horizontal deflection coil 81 in a reproducing device, the distance of displacement of the stripe-pattern is selected to be such that stripe-patterns 88' appear between the adjacent stripe-patterns 88 which are ahead of them as shown in FIGURE 10B. The distance of the displacement is usually selected to be a value such that the stripes 88' of the following one frame appears between the adjacent stripe-pattern 88 of the preceding one frame. Thus, the position of the stripe-pattern is not fixed in a reproducing device to an observer, and hence the effect of the stripe-pattern can essentially be reduced. In the foregoing examples described in connection with FIGURES 8 through 10, the rectangular wave current generator circuit driven by vertical synchronizing signals has been described. However, by driving the rectangular wave current generator 85 with the horizontal synchronizing signal circuit 83, it is possible to obtain a rectangular wave current such that its cycle coincides with that of the horizontal deflection current and the distance of the displacement is selected to be the above value and further its phase is inverted every vertical deflection period. In addition, it is also possible that another coil is disposed in the pickup tube 50, to which a rectangular wave current is supplied, without being restricted to the case where the rectangular wave current is supplied to the horizontal deflection coil. Furthermore, if the pickup tube is of an electrostatic deflection type, the aforementioned unnecessary component may essentially be intercepted by supplying a rectangular wave voltage to deflection electrodes. It is also possible to supply a rectangular wave current to a reproducing device, namely a cathode-ray tube, without being limited to the case where the aforesaid rectangular wave current is supplied to deflection means of a pickup tube.

It there are produced variations in $\omega_B$ and $\omega_R$ to be added or obtained from the filters 53 and 54 in FIGURE 5, means for cutting off the variations may be provided in this invention. When there are variations in the horizontal signal frequency from the horizontal deflection output circuit 82 in FIGURE 8, the angular frequencies $\omega_B$ and $\omega_R$ of the signals to be added to the filters 53 and 54 vary, so that they exceed the band widths of these filters 53 and 54 or the characteristics in their band widths become uneven, as a result of this, distortion is made and the quality of picture is deteriorated. To remove this disadvantage, the output of either one of the filters 53 and 54 (the filter 54 in FIGURE 11) in the circuit of FIGURE 8, as shown in FIGURE 11 is applied to a frequency discriminator 89, where the variation of the angular frequency $\omega_R$ to be supplied to the filter 54 is detected and thus detected signal is added to, for example the horizontal deflection coil 81 of the pickup tube 50. In FIGURE 11, parts corresponding to those in FIGURE 8 are marked with the same numeral references. It is of course possible to add the output of the discriminator 89 to the horizontal synchronizing circuit or to the horizontal deflection output circuit. Of course, the output of the discriminator must be added in the direction in which the variation of the frequency component to be obtained at the pickup tube is intercepted. However, it may occur in some cases that either one or both of the red and blue lights projected to the photoelectro conversion layer of the pickup tube 50 does not appear by being intercepted in stripes by the colored light from an object to be transmitted as described above. To avoid this, it is possible to provide the aforementioned frequency discriminator 89 in both lines of the filters 53 and 54. In some case, a certain amount of a light which is different from the colored light from an object to be televised is made to be projected uniformly all over the photoelectro conversion layer of the pickup tube 50 through the aforementioned filter 15, and carriers to be produced by this projected light always exist. Accordingly, even if some colored light is not contained in that from an object as described above, favorable results may be obtained without interrupting the operation of the frequency discriminator circuit. Specifically in the case where the colored light to be projected on the photoconductive layer intercepted in stripes is only one, this means is necessary.

Other means which may be substituted for such means detects the variation of the angular frequency component to be added to the filters 53 and 54 as described above in FIGURE 11, thereby changing the electrical constant of the filter 53 and/or the filter 54. Accordingly the center frequency of the filter 53 and/or the filter 54 in response to the deviation of the center frequency of the signal to be added to the filter 53 and/or the filter 54, and hence the signal may accurately be passed over the entire bandwidth. Therefore, it is also possible to provide a variable element, for example a variable inductor or a variable capacitor in the filter 53 and/or the filter 54 as shown in FIGURE 12 and to control its moving element with the output of the discriminator circuit. In some cases, the band of the filter 52 may be made variable.

Furthermore, the pitch of the filters to be disposed in front of the pickup tube 50 or on the face 7 is determined in such a manner that the center frequencies of the band-pass filters 53 and 54 are identical to the value previously described, but it becomes necessary to make their bands different and to change their center frequencies. To perform this, it seems sufficient merely to change the pitch of the filters but it is particularly difficult to change the pitch of the filters as desired, and further it is essentially impossible to change the pitch minutely. For this reason, means is necessary for changing the center frequency of the band without changing the pitch of the filters. Therefore, the filters are arranged in a manner so that their extending direction of the filter elements of the filters are different from substantially the vertical direction in which the filter elements extend as illustrated in FIGURE 13A. Then, the relative angular velocity across the horizontal scanning line 90 varies, and hence if this variation is predetermined according to the center frequency of the band-pass filter, the aforementioned object may be attained.

The foregoing has been made in connection with the case where color television signals are obtained by the use of a pickup tube having filters attached on the face thereof, but the same effects may be obtained even by arranging a filter composed of two filter components described previously in FIGURE 3 in the optical path of an object to be televised and a pickup tube, more precisely at a place where a real image is formed. Furthermore, it will be seen that even if the path of the colored light from a televised object is divided into two and the filter components 15*a* and 15*b* described previously in FIGURE 3 are provided at places where real images are made in the respective paths, the above effects may be obtained.

The important feature of this invention resides in that this invention may be used in an image-orthicon type pickup tube. By the way, the conventional filter means and target means previously described in FIGURE 2 cannot be applied to a device for obtaining television signals by the use of secondary electron beams such as in an image-orthicon.

It will be apparent that many modifications and variations may be effected without departing from the scope of the novel concept of this invention.

What is claimed is:

1. A color television signal generating system comprising an image pick up tube provided with an optical filter placed in front thereof and a single video output terminal, a low-pass filter, a plurality of band-pass filters, said low-pass filter and band-pass filters being supplied with video signals from said single video output terminal, and a plurality of detectors for detecting output signals from said band-pass filters, said optical filter being composed of a plurality of filter components, each being arranged with any two of three kinds of strip filter elements, a first one of said strip filter elements being capable of essentially transmitting all colored lights from an object to be transmitted, a second one being capable of intercepting substantially one colored light of said all colored lights and a third one being capable of intercepting substantially another colored light different from that intercepted by said second one, said optical filter being positioned at a place where a real image is essentially formed between said object and the photo-electric conversion layer of said image pickup tube in a manner so that the longitudinal direction of said strip filter elements is different from the scanning direction of the electron beams and said filter components having different pitches from one another to generate different carrier frequencies corresponding to said pitches due to scanning, thereby obtaining color signals from said detectors and low-pass filter.

2. A color television signal generating system as claimed in claim 1, wherein outputs from said band-pass filters are applied to a beat signal generating circuit and the outputs from said beat signal generating circuit is applied to a channel including said low-pass filter.

3. A color television signal generating system as claimed in claim 1, wherein in a device for reproducing color television signals a desired position of the horizontal scanning line of said image pickup tube is so shifted from its regular position in the direction of the horizontal direction that strip-patterns which may be caused due to said filter are appreciably reduced.

4. A color television signal generating system as claimed in claim 1, wherein the center frequency of the signals to be applied to said band-pass filter is altered by changing the longitudinal direction of the strip filter elements of said filter component with respect to the scanning direction of electron beams.

5. A color television signal generating system as claimed in claim 1, wherein a discriminator is provided for discriminating the deviation of the center frequency of the signals to be applied to said band-pass filter, said deviation being caused by non-linearity of the horizontal scanning speed and deviation of horizontal scanning amplitude and said discriminated signal controlling a horizontal deflection device of said image pickup tube.

6. A color television signal generating system as claimed in claim 1, wherein a discriminator is provided for discriminating the deviation of the center frequency of the signals to be applied to said band-pass filter, said deviation being caused by non-linearity of the horizontal scanning speed and deviation of horizontal scanning amplitude and said discriminated signals controlling the center frequency of said band-pass filters.

7. An image pickup tube comprising an optical filter placed in front thereof and a single video output terminal, said optical filter being composed of a plurality of filter components, each being arranged with any two of three kinds of strip filter elements, a first one of said strip filter elements being capable of essentially transmitting all colored lights from an object to be transmitted, a second one being capable of intercepting substantially one colored light of said all colored lights and a third one being capable of intercepting substantially another colored light different from that intercepted by said second one, said optical filter being positioned at a place where a real image is essentially formed between said object and the photo-electric conversion layer of said image pickup tube in a manner so that the longitudinal direction of said strip filter elements is different from the scanning direction of the electron beams and said filter components having different pitches from one another to generate different carrier frequencies corresponding to said pitches due to scanning, thereby obtaining color signals.

8. An image pickup tube as claimed in claim 7, wherein all of said filter components are positioned at a place where a real image is essentially formed in a single optical path between said object and single image pickup tube.

References Cited by the Examiner

UNITED STATES PATENTS

| | | | |
|---|---|---|---|
| 2,674,649 | 4/1954 | Wetzel | 178—5.4 |
| 2,705,258 | 3/1955 | Lesti | 178—5.4 |
| 2,733,291 | 1/1956 | Kell | 178—5.4 |
| 2,769,855 | 11/1956 | Boothroyd et al. | 178—5.4 |
| 2,892,883 | 6/1959 | Jesty et al. | 315—10 |
| 2,901,531 | 8/1959 | McCoy et al. | 315—10 |

DAVID G. REDINBAUGH, *Primary Examiner.*

J. H. SCOTT, *Assistant Examiner.*